United States Patent
Sonoda et al.

(10) Patent No.: US 8,958,042 B2
(45) Date of Patent: Feb. 17, 2015

(54) LIQUID CRYSTAL DISPLAY DEVICE

(75) Inventors: Hidehiro Sonoda, Mobara (JP); Chikae Matsui, Mobara (JP); Noboru Kunimatsu, Chiba (JP)

(73) Assignees: Japan Display Inc., Tokyo (JP); Panasonic Liquid Crystal Display Co., Ltd., Himeji-shi (JP)

( * ) Notice: Subject to any disclaimer, the term of this patent is extended or adjusted under 35 U.S.C. 154(b) by 494 days.

(21) Appl. No.: 12/700,793

(22) Filed: Feb. 5, 2010

(65) Prior Publication Data
US 2010/0201933 A1 Aug. 12, 2010

(30) Foreign Application Priority Data

Feb. 9, 2009 (JP) ................................. 2009-027314

(51) Int. Cl.
G02F 1/1343 (2006.01)
G02F 1/1339 (2006.01)
G02F 1/1362 (2006.01)

(52) U.S. Cl.
CPC ...... *G02F 1/13394* (2013.01); *G02F 1/134363* (2013.01); *G02F 1/136286* (2013.01)
USPC .......................................... 349/141; 349/155

(58) Field of Classification Search
USPC ............................. 349/39, 141, 155, 156, 38
See application file for complete search history.

(56) References Cited

U.S. PATENT DOCUMENTS

2004/0218131 A1* 11/2004 Kim et al. ...................... 349/141
2006/0146222 A1* 7/2006 Kim et al. ......................... 349/56
2006/0285060 A1 12/2006 Misaki et al.
2007/0273819 A1* 11/2007 Kawasaki et al. ............. 349/141
2008/0284965 A1* 11/2008 Ryu et al. ....................... 349/141
2009/0086145 A1* 4/2009 Horiguchi et al. ............ 349/141

FOREIGN PATENT DOCUMENTS

| JP | 2003-207785 | 7/2003 |
| JP | 2005-242310 | 9/2005 |
| JP | 2005-345819 | 12/2005 |
| JP | 2003-330470 | 12/2006 |
| JP | 2006-330470 | 12/2006 |
| JP | 2009-20273 | 1/2009 |

OTHER PUBLICATIONS

English translation of foreign corresponding Japanese Patent Application, dated Jul. 15, 2014.

* cited by examiner

*Primary Examiner* — Jessica M Merlin
(74) *Attorney, Agent, or Firm* — Antonelli, Terry, Stout & Kraus, LLP.

(57) ABSTRACT

A liquid crystal display device of the invention can, when a liquid crystal panel receives a pressing force from the outside, prevent the displacement of columnar spacers which are formed over a counter substrate for defining a distance between the counter substrate and a TFT substrate in the direction parallel to the substrate. In a case where the TFT substrate or the counter substrate receives a pressing force from the outside, when the columnar spacers which define the distance between the TFT substrate and the counter substrate are displaced in one or more directions, the alignment disorder of liquid crystal molecules occurs or an alignment film is shaved so that leaking of light occurs due to shaved chips of the alignment film and hence, contrast of an image is lowered. Projections are formed on a TFT substrate side by making use of bus electrodes provided for preventing lowering of a voltage of counter electrodes. When the TFT substrate or the counter substrate receives a pressing force from the outside, the projections bite into a distal end of the columnar spacer so that the displacement of the columnar spacer in one or more directions can be prevented.

10 Claims, 11 Drawing Sheets

| (A) | (B) | (C) | (Z) |
|---|---|---|---|
| 220 nm | 12 μm | 90 nm | OCCURRED |
| 220 nm | 6 μm | 70 nm | SLIGHTLY OCCURRED |
| 220 nm | 3 μm | 50 nm | NOT OCCURRED |

B-B

C-C

C-C

LIQUID CRYSTAL DISPLAY DEVICE

CLAIM OF PRIORITY

The present application claims priority from Japanese application serial No. 2009-27314, filed on Feb. 9, 2009, the content of which is hereby incorporated by reference into this application.

BACKGROUND OF THE INVENTION

1. Field of the Invention

The present invention relates to a liquid crystal display device, and more particularly to a technique for setting a proper distance between a TFT substrate and a counter substrate by spacers.

2. Background Art

In a liquid crystal display device, liquid crystal is filled in a space formed between a TFT substrate on which pixel electrodes and thin film transistors (TFT) are formed and a counter substrate on which color filters and the like are formed, and images are formed by controlling molecules of the liquid crystal by an electric field which is generated between a pixel electrode and a counter electrode in response to a video signal. The distance between the TFT substrate and the counter substrate is extremely narrow, that is, several microns.

Conventionally, a distance between a TFT substrate and a counter substrate has been maintained by dispersing small beads or the like in the space formed between the substrates. However, a method which controls the distance by dispersing the beads in the space forms places where the number of beads is large and places where the number of beads is small. As a result, the distance between the TFT substrate and the counter substrate becomes non-uniform. When the distance between the TFT substrate and the counter substrate becomes non-uniform, there arises a drawback that a contrast of an image displayed on the liquid crystal display device is lowered or a drawback that an image becomes irregular.

To cope with such a non-uniform distance, as a method of defining a distance between a TFT substrate and a counter substrate, there has been developed a method (a support column method) which mounts columnar spacers formed of an organic film on the counter substrate. Since the columnar spacers are fixed to the counter substrate, it is possible to control the distance between the TFT substrate and the counter substrate in a stable manner. Further, in the columnar spacer method, when liquid crystal is filled into a space by a method which fills liquid crystal in the space by dropping the liquid crystal (liquid-crystal dropping filling method), differently from the method which uses the beads, the positions of the columnar spacers are not displaced at the time of dropping liquid crystal. Accordingly, the columnar spacer method is preferable.

Multi-layered lines which are provided for forming TFTs, video signal lines, scanning lines and the like are formed over a TFT substrate, and contact holes for connecting multi-layered lines with each other are formed in the TFT substrate. Portions of the TFT substrate where the contact holes are formed constitute recessed portions. On the other hand, columnar spacers are formed over the counter substrate. When the columnar spacers enter the contact hole portions, it is difficult to maintain a predetermined distance between the TFT substrate and the counter substrate. JP-A-2005-345819 (patent document 1) discloses the constitution where although it is desirable that the columnar spacers do not enter the contact holes, even when some columnar spacers may enter the contact holes, remaining columnar spacers which do not enter the contact holes maintain the distance between the TFT substrate and the counter substrate.

Besides the contact hole portions, convex portions are also formed over portions of the TFT substrate such as portions where lines intersect with each other and hence, a surface of the TFT substrate is not flat. JP-A-2005-242310 (patent document 2) discloses the constitution where columnar spacers having a fixed height are formed over a counter substrate, wherein some columnar spacers are brought into contact with a flat portion of the TFT substrate, and other columnar spacers are brought into contact with the convex portions. That is, patent document 2 discloses the constitution where other columnar spacers are compressed by an amount corresponding to the convex portions formed of lines or the like, and this compression amount acts as a so-called gravity margin. In this case, a compression amount of other columnar spacers is approximately 200 nm to 600 nm.

SUMMARY OF THE INVENTION

A columnar spacer is formed using a photosensitive organic resin in general. A cell gap of a liquid crystal display device is usually 2 to 5 μm, and it is necessary for the columnar spacer also to have the same height as the cell gap. In general, it is difficult to reduce a pattern forming width in a state where a film thickness of a photosensitive material film is large. For example, when a projection having a height of 3.5 μm is formed using a columnar spacer forming material (NN-777) made by a JSR Ltd, the pattern forming width for the columnar spacer becomes 12 μm.

On the other hand, recently, a liquid crystal display device is requested to satisfy high definition. To achieve the high definition, a size of one pixel of the liquid crystal display device must be small. On the other hand, the liquid crystal display device is requested not to lower transmissivity thereof to ensure brightness thereof. Accordingly, efforts have been made to make lines around the pixel as narrow as possible.

In such a liquid crystal display device, there is often the case where a width of the line is smaller than a diameter of the columnar spacer. The lines are formed over a TFT substrate on which pixel electrodes and TFTs are formed, and these lines are covered with a light blocking film (black matrix) formed over a counter substrate.

Columnar spacers are formed over the counter substrate, and distal ends of the columnar spacers are not adhered to the TFT substrate although the distal ends of the columnar spacers are brought into contact with the TFT substrate. Accordingly, when a pressing force is applied to the counter substrate or the TFT substrate from the outside, there arises a phenomenon that the columnar spacer is displaced from an original position thereof. When the columnar spacer is displaced from the original position, the misalignment of liquid crystal occurs in the vicinity of the columnar spacer so that leaking of light occurs thus lowering a contrast of an image displayed on the liquid crystal display device.

Further, when the columnar spacer is displaced, an alignment film in the vicinity of a distal end of the columnar spacer is shaved and shaved chips of the alignment film are scattered around the columnar spacer. The shaved chips of alignment film adversely affect the alignment direction of liquid crystal so that leaking of light occurs leading to lowering of contrast of an image displayed on the liquid crystal display device.

This drawback that the contrast of an image displayed on the liquid crystal display device is lowered attributed to the movement of the columnar spacer by a pressing force from the outside can be overcome by increasing a width of the black matrix formed over the counter substrate. In this case, however, optical transmissivity of light is decreased so that brightness of a screen is lowered.

The task of the invention lies in the prevention of lowering of a contrast of an image displayed on the liquid crystal display device attributed to the movement of the columnar spacer by a pressing force from the outside without lowering brightness of a screen.

The invention is provided to overcome the above-mentioned drawbacks. In the invention, stoppers having a narrow width are formed over a TFT substrate side with which distal ends of columnar spacers are brought into contact. Due to such a constitution, even when a pressing force is applied to a liquid crystal display panel from the outside, the displacement of the columnar spacer can be prevented and hence, the misalignment of liquid crystal can be prevented thus preventing lowering of contrast of an image displayed on the liquid crystal display device. To explain specific examples, they are as follows.

(1) According to one aspect of the invention, there is provided a liquid crystal display device which includes: a TFT substrate on which a pixel is formed in each of regions surrounded by scanning lines which extend in the first direction and are arranged parallel to each other in the second direction and video signal lines which extend in the second direction and are arranged parallel to each other in the first direction; a counter substrate which is arranged to face the TFT substrate in an opposed manner; and a liquid crystal layer which is sandwiched between the TFT substrate and the counter substrate, wherein a pixel electrode formed in a planar shape and a counter electrode formed in a comb-teeth shape on the pixel electrode by way of an insulation film are arranged in the pixel, columnar spacers which define a distance between the TFT substrate and the counter substrate are formed over the counter substrate, a bus electrode made of metal which extends in the first direction and is connected with the counter electrode is formed over the scanning line formed over the TFT substrate, and a distal end of the columnar spacer faces the bus electrode in an opposed manner, and a width of the bus electrode is 3 μm or less.

(2) In the liquid crystal display device having the above-mentioned constitution (1), the bus electrode extends in the second direction and has a cruciform shape at an intersection of the scanning line and the video signal line, and a distal end of the columnar spacer faces the bus electrode having the cruciform shape in an opposed manner.

(3) In the liquid crystal display device having the above-mentioned constitution (1), island-shape projections which are formed using the same material as the bus electrode are formed in the vicinity of intersections of the scanning lines and the video signal lines while sandwiching the bus electrode between two neighboring projections, a width of the island-shape projection is 3 μm or less, and the columnar spacer faces either one of the bus electrode and the island-shape projection in an opposed manner.

(4) According to another aspect of the invention, there is provided a liquid crystal display device which includes: a TFT substrate on which a pixel is formed in each of regions surrounded by scanning lines which extend in the first direction and are arranged parallel to each other in the second direction and video signal lines which extend in the second direction and are arranged parallel to each other in the first direction; a counter substrate which is arranged to face the TFT substrate in an opposed manner; and a liquid crystal layer which is sandwiched between the TFT substrate and the counter substrate, wherein a counter electrode formed in a planar shape and a pixel electrode formed in a comb-teeth shape on the counter electrode by way of an insulation film are arranged in the pixel, columnar spacers which define a distance between the TFT substrate and the counter substrate are formed over the counter substrate, projections which are formed using the same material as the pixel electrodes are formed over the scanning line formed over the TFT substrate, and a distal end of the columnar spacer faces the projection in an opposed manner, and a width of the projection is 3 μm or less.

(5) In the liquid crystal display device having the above-mentioned constitution (4), the projection extends in the first direction and the second direction thus forming a cruciform shape at an intersection of the scanning line and the video signal line, and a distal end of the columnar spacer faces the projection having a cruciform shape in an opposed manner.

(6) In the liquid crystal display device having the above-mentioned constitution (4), a plurality of projections are formed in an inland shape at an intersection of the scanning line and the video signal line.

(7) According to still another aspect of the invention, there is provided a liquid crystal display device which includes: a TFT substrate on which a pixel electrode is formed in each of regions surrounded by scanning lines which extend in the first direction and are arranged parallel to each other in the second direction and video signal lines which extend in the second direction and are arranged parallel to each other in the first direction; a counter substrate which is arranged to face the TFT substrate in an opposed manner; and a liquid crystal layer which is sandwiched between the TFT substrate and the counter substrate, wherein a counter electrode is formed over the counter substrate in a state where the counter electrode faces the pixel electrodes formed on the TFT substrate in an opposed manner, columnar spacers which define a distance between the TFT substrate and the counter substrate are formed over the counter substrate, projections which are formed using the same material as the pixel electrodes are formed over the scanning lines of the TFT substrate, and a distal end of the columnar spacer faces the projection in an opposed manner, and a width of the projection is 3 μm or less.

(8) In the liquid crystal display device having the above-mentioned constitution (7), the projection extends in the first direction and the second direction thus forming a cruciform shape at an intersection of the scanning line and the video signal line, and the distal end of the columnar spacer faces the projection having the cruciform shape in an opposed manner.

(9) In the liquid crystal display device having the above-mentioned constitution (7), a plurality of island-shaped projections are formed at an intersection of the scanning line and the video signal line.

According to the invention, the narrow stoppers are formed over a TFT substrate side with which distal ends of the columnar spacers formed over the counter substrate are brought into contact and hence, there is no possibility the columnar spacers move even when the liquid crystal display panel receives a pressing force from the outside. Accordingly, it is possible to prevent the alignment disorder of liquid crystal and hence, leaking of light can be prevented whereby it is possible to prevent lowering of contrast of an image displayed on the liquid crystal display device without lowering brightness of a screen.

Further, shaving of the alignment film attributed to the movement of the columnar spacer can be prevented and hence, leaking of light attributed to shaved chips of alignment film can be prevented. Accordingly, it is possible to prevent lowering of contrast of an image without lowering brightness of a screen.

BRIEF DESCRIPTION OF THE DRAWING

FIG. 5 is a view showing the comparison between a width of a projection and a minute luminescent point;

DESCRIPTION OF THE PREFERRED EMBODIMENT

Figure 1:
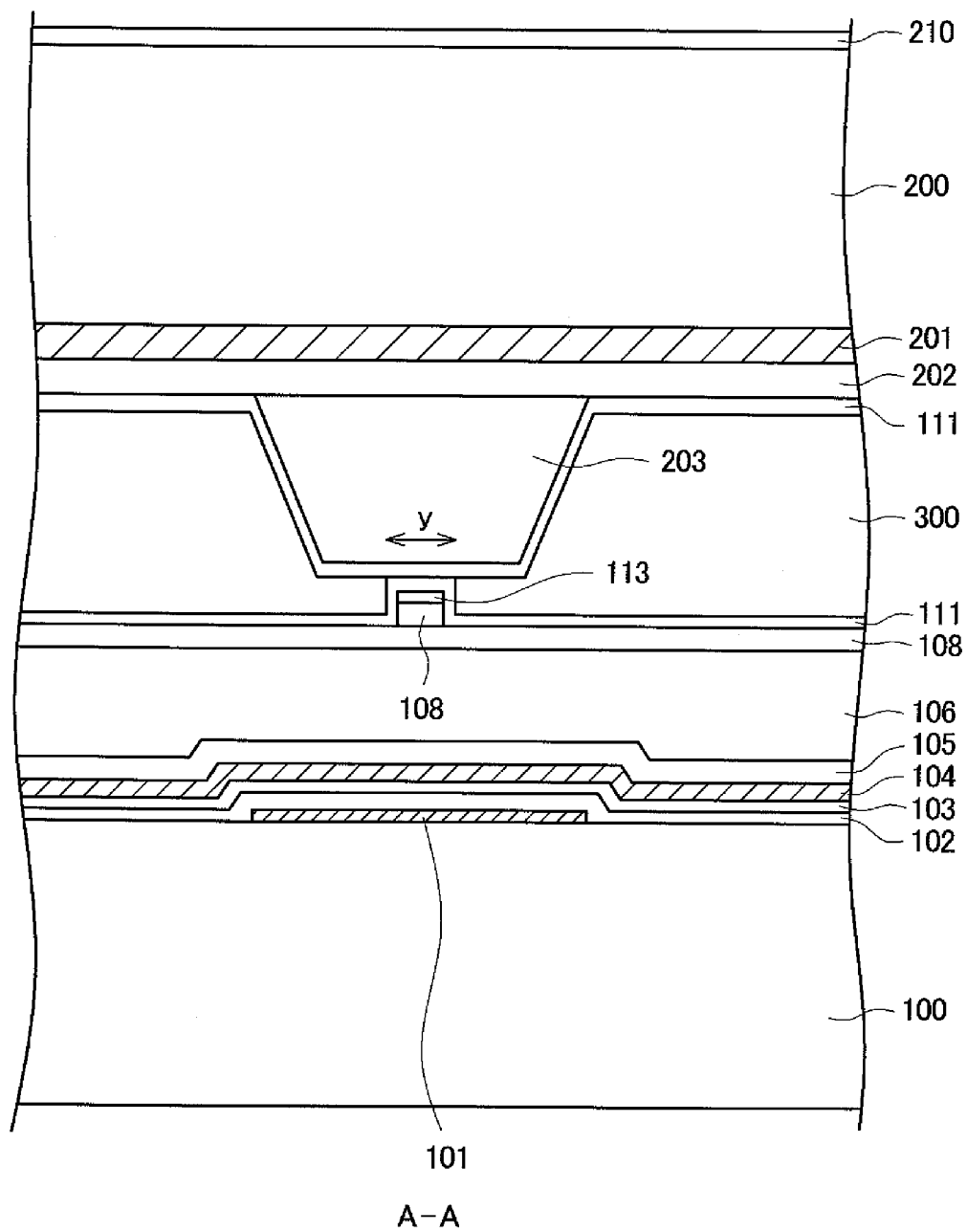
FIG. 1 is a cross-sectional view of a liquid crystal display device according to an embodiment 1 of the invention.

Hereinafter, the invention is explained in detail in conjunction with embodiments.

Embodiment 1

In this embodiment, the explanation is made with respect to a case where a liquid crystal display device is an IPS (In Plane Switching) liquid crystal display device (hereinafter, referred to as an IPS). The IPS is a liquid crystal display device in which counter electrodes 109 and pixel electrodes 112 are formed over a TFT substrate 100. In the liquid crystal display device, by rotating liquid crystal molecules using an electric field in the direction parallel to the substrate out of an electric field generated between the pixel electrode 112 and the counter electrode 109, a quantity of light which passes through pixels is controlled. The liquid crystal display device possesses excellent angle of visibility.

Figure 3:
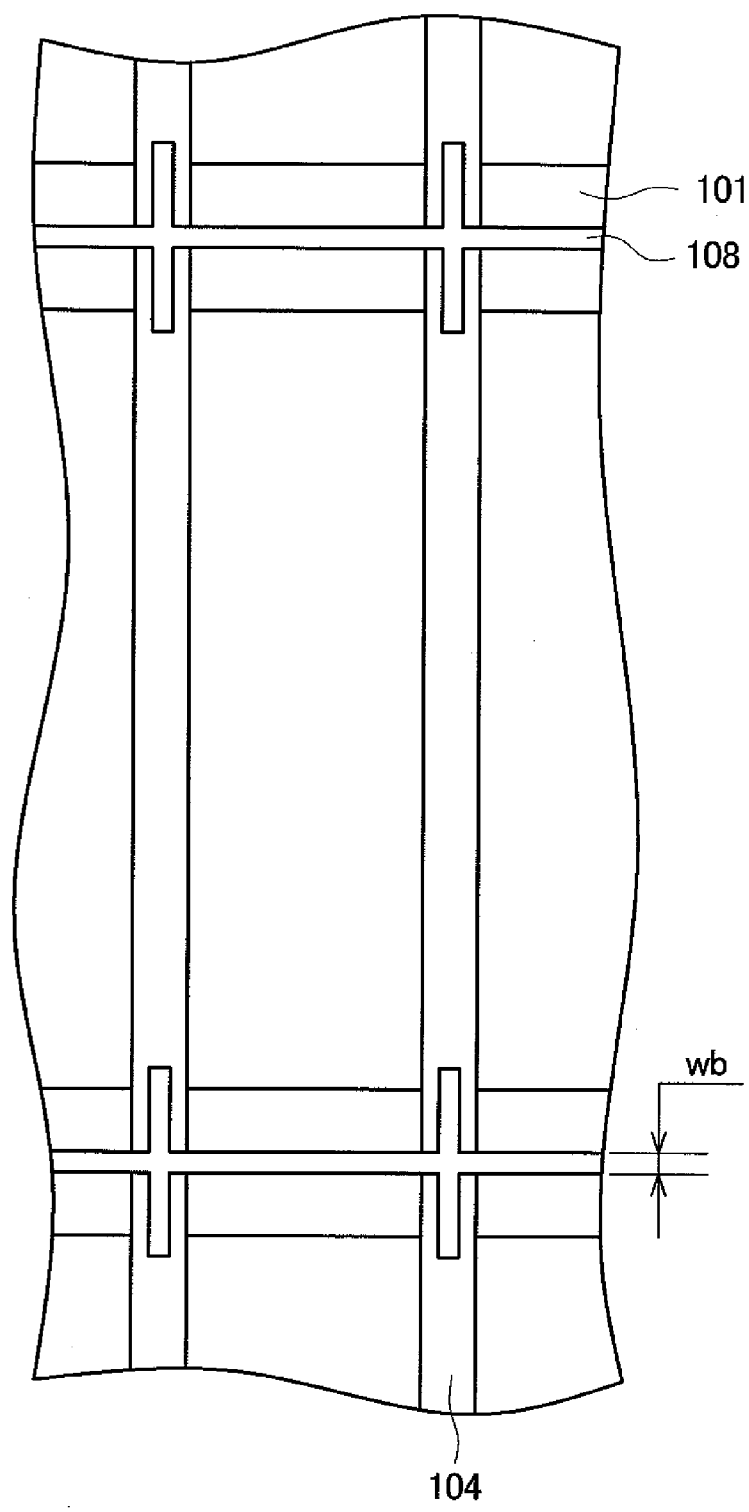
FIG. 3 is a plan view of a TFT substrate according to the embodiment 1.

FIG. 3 is a schematic plan view showing the arrangement of scanning lines 101, video signal lines 104, and pixels formed over the TFT substrate 100. In FIG. 3, the scanning lines 101 extend in the lateral direction and are arranged parallel to each other in the longitudinal direction. The video signal lines 104 extend in the longitudinal direction and are arranged parallel to each other in the lateral direction with an insulation film sandwiched between the scanning lines 101 and the video signal lines 104. A region which is surrounded by the scanning lines 101 and the video signal lines 104 constitutes a pixel.

A TFT not shown in the drawing is formed over the scanning line 101. The scanning line 101 functions also as a gate electrode of the TFT. When a potential of the scanning line 101 assumes an ON level, the TFT is turned on so that a signal is applied to the pixel electrode 112 from the video signal line 104. Although not shown in FIG. 3, the pixel 112 is formed of an ITO film which constitutes a transparent conductive film. The pixel electrode is formed of a matted planar electrode.

Figure 4:
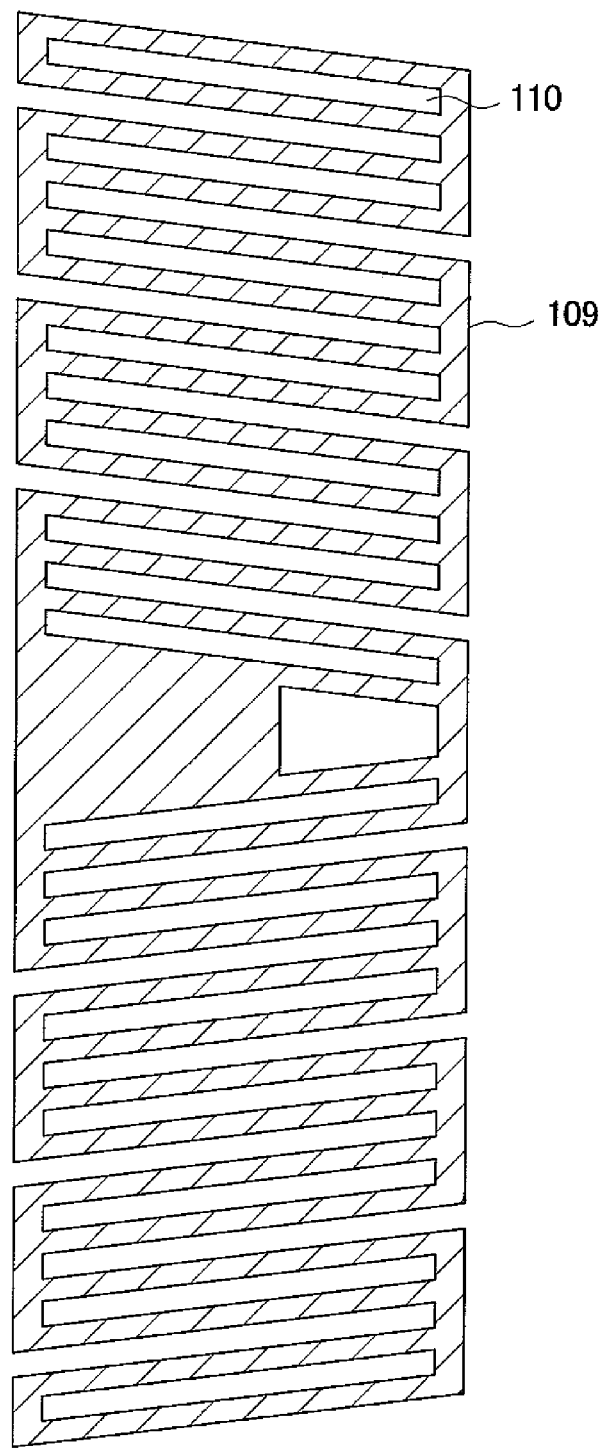
FIG. 4 is a plan view of a counter electrode according to the embodiment 1.

A counter electrode 109 is formed over the pixel electrode 112 by way of an interlayer insulation film 107. The counter electrode 109 is also formed of an ITO which constitutes a transparent conductive film. A reference potential is applied to the counter electrode 109. An example of the counter electrode 109 is shown in FIG. 4. In FIG. 4, the counter electrode 109 is a comb-teeth-shaped electrode which has both ends thereof closed. A slit 110 is formed between the neighboring two comb teeth.

Below the counter electrode 109 shown in FIG. 4, the matted planar pixel electrode 112 (not shown in the drawing) is formed. When a voltage is applied to the pixel electrode 112 in response to the video signal, an electric field is generated between the pixel electrode 112 and the counter electrode 109 to which a reference voltage shown in FIG. 4 is applied. To be more specific, lines of electric force are generated in the direction from the comb-teeth-shaped counter electrode to the pixel electrode 112 arranged below the counter electrode by way of the slits 110. Liquid crystal molecules of a liquid crystal layer 300 are rotated by the lines of electric force, thus controlling a quantity of light which passes through the liquid crystal layer 300. By controlling a quantity of light for every pixel, an image can be formed.

The reference voltage is applied to the counter electrode 109 and hence, a potential used in common by the respective pixels is applied to the counter electrode 109. The reference voltage is supplied to the counter electrode 109 from the outside of the display region. ITO has relatively large resistance and hence, a potential of the counter electrode 109 is gradually lowered as a distance from a power source line is increased. This phenomenon causes the brightness gradient.

For preventing such brightness gradient, a bus electrode 108 made of metal is arranged on the scanning electrode thus preventing a change of a voltage of the counter electrode 109. The bus electrode 108 has the stacked structure consisting of a Cr layer and a Mo layer, for example. In the invention, by setting a width wb of the bus electrode 108 to 3 μm or less, a stopper for a columnar-shaped spacer 203 is formed by the bus electrode 108. The bus electrode 108 has a cruciform shape at an intersection where the scanning line 101 and the video signal line 104 intersect each other. Here, as described later, the counter electrode 109 which is constituted of a transparent electrode is formed over the bus electrodes 108.

Figure 2:
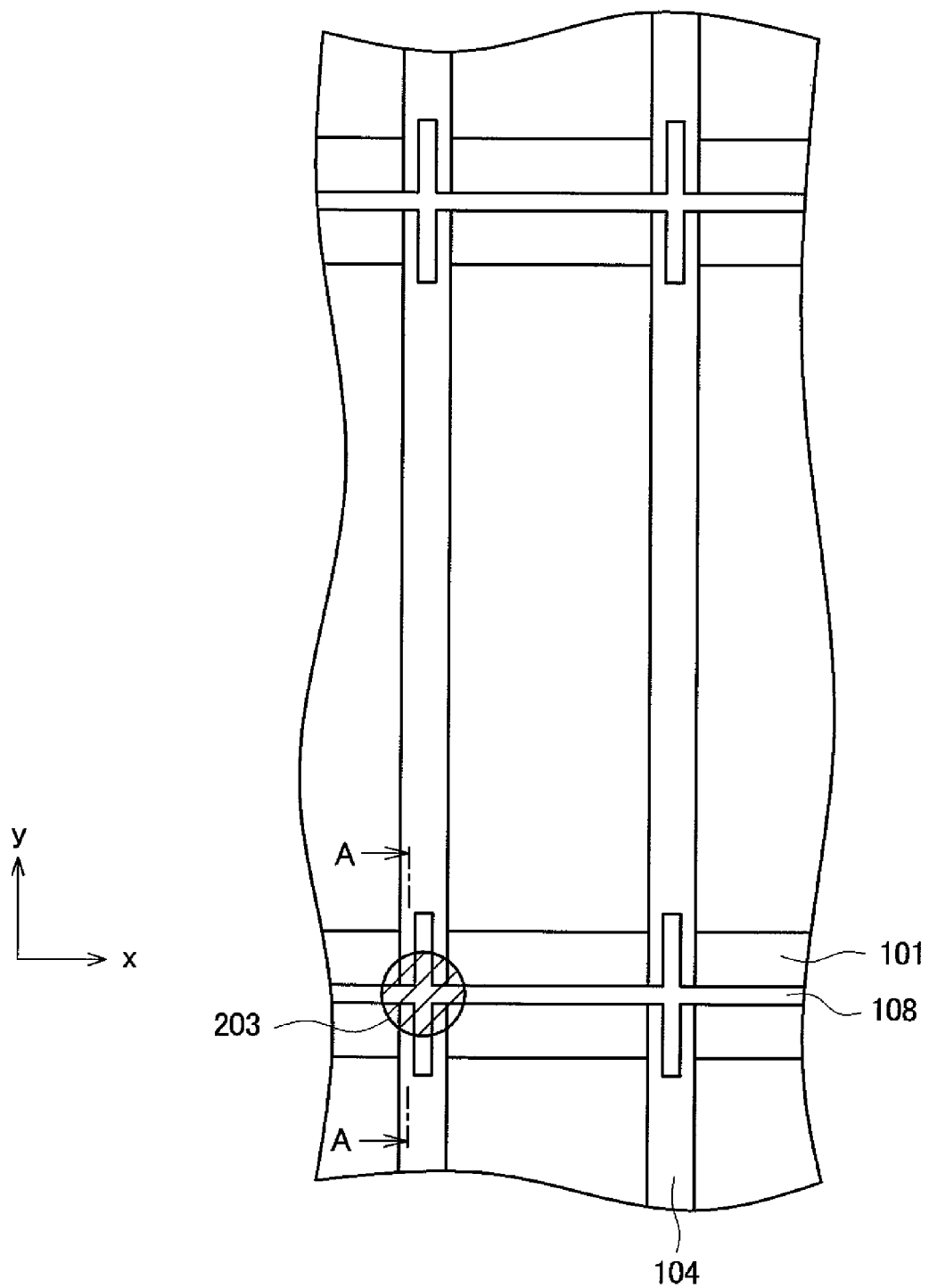
FIG. 2 is a plan view of the liquid crystal display device according to the embodiment 1 of the invention.

FIG. 2 is a plan view showing a state where the columnar spacer 203 which is formed over the counter substrate 200 is brought into contact with the bus electrode 108 at an intersection of the scanning line 101 and the video signal line 104 on the TFT substrate 100 shown in FIG. 3. The columnar spacer 203 is not always formed at all intersections of the scanning lines 101 and the video signal lines 104. The columnar spacers 203 are provided for defining the distance between the TFT substrate 100 and the counter substrate 200 and hence, it is sufficient to provide the number of spacers 203 which is necessary minimum. That is, the presence of the columnar spacers 203 causes the alignment disorder of liquid crystal or the like and hence, the columnar spacers 203 are arranged at pitches necessary for maintaining the distance between the counter substrate 200 and the TFT substrate 100.

In FIG. 2, the bus electrode 108 is formed in a cruciform shape at the intersection of the scanning line 101 and the video signal line 104, and the center of the columnar spacer 203 is aligned with the center of the bus electrode 108 having a cruciform shape. Due to such arrangement, a distal end of the columnar spacer 203 is brought into contact with a stopper having a narrow width which is formed of the bus electrode 108. That is, when the counter substrate 200 or the TFT substrate 100 receives a pressing force from the outside, the stopper having a narrow width bites into the distal end of the columnar spacer 203 and hence, it is possible to prevent the columnar spacer 203 from being displaced.

FIG. 1 is a cross-sectional view of the liquid crystal display device taken along a line A-A in FIG. 2 and shows a technical feature of the invention. In FIG. 1, the scanning lines 101 are formed over the TFT substrate 100. A gate insulation film 102 is formed over the scanning lines 101. The semiconductor layer 103 is formed over the scanning lines 101. The video signal lines 104 are formed over the semiconductor layer 103.

Here, in FIG. 2, on the scanning line 101 which is displaced from the intersection of the scanning line 101 and the video signal line 104, a TFT is formed using a source electrode and a drain electrode which are formed over the same layer as the scanning line 101, the gate insulation film 102, the semiconductor layer 103, and the video signal line 104. The semiconductor layer 103 shown in FIG. 1 is provided for preventing the stepped disconnection of the gate insulation film 102.

In FIG. 1, an inorganic passivation film 105 is formed over the video signal line 104. An organic passivation film 106 which functions also as a leveling film is formed over the inorganic passivation film 105. The organic passivation film 106 has a large thickness of, for example, approximately 2 μm and hence, an upper surface of the organic passivation film 106 is made flat.

An interlayer insulation film 107 is formed over the organic passivation film 106. The interlayer insulation film 107 is provided for ensuring the insulation between the pixel electrode 112 and the counter electrode 109 in the pixel. Since a cross-sectional view shown in FIG. 1 is taken along the video signal line 104 and hence, the pixel electrode 112 is not present in FIG. 1.

In FIG. 1, the bus electrode 108 is formed over the interlayer insulation film 107. The cross section shown in FIG. 1 is taken at a position displaced from the cruciform intersection as shown in FIG. 2 and hence, the bus electrode 108 has projecting shape in FIG. 1. A projecting ITO 113 is formed over the bus electrode 108. The stopper is constituted of the bus electrode 108 and the projecting ITO 113. An alignment film 111 is formed over the stoppers.

The ITO 113 is formed in an island shape in the vicinity of the intersection of the scanning line 101 and the video signal line 104. The ITO 113 is formed in an island shape so as to make the projection steeper. However, at positions other than the intersections of the scanning lines 101 and the video signal lines 104, the ITO 113 is connected to the bus electrode 108 so as to cover the bus electrode 108.

In FIG. 1, on a TFT-substrate-100 side of the counter substrate 200, a black matrix 201 is formed. FIG. 1 shows a case where the cross section is taken along the video signal line 104 and hence, the black matrix 201 is formed over the counter substrate 200. However, in a cross section taken along the pixel region, red, green and blue color filters and the like are formed over the counter substrate 200. On the black matrix 201, an overcoat film 202 is formed for alleviating surface unevenness formed by the black matrix 201 and the color filters.

The columnar spacers 203 are formed over the overcoat film 202. The columnar spacer 203 is formed as follows, for example. A photosensitive acrylic resin is applied to the overcoat film 202 with a thickness substantially equal to a height of the columnar spacers. The photosensitive acrylic resin is subject to exposure using a mask such that cross-linking of only portions of the photosensitive acrylic resin to which light is radiated is accelerated thus making such portions insoluble with a developing solution. Thereafter, by developing the photosensitive resin, the columnar spacer 203 can be formed. An alignment film 111 is formed over the columnar spacer 203.

In FIG. 1, both the pixel electrodes 112 and the counter electrode 109 are formed over the TFT substrate 100, and no electrodes are formed over the counter substrate 200. Accordingly, when electric noises intrude into the liquid crystal display device from a counter substrate 200 side, the electric noises influences the liquid crystal layer 300 thus deteriorating image quality. For preventing such a drawback, a surface conductive film 210 is formed over an outer side of the counter electrode 109 and a voltage of the surface conductive film 210 is set to ground voltage or a reference voltage and hence, the inside of the liquid crystal display panel is electrically shielded from the outside.

FIG. 1 shows a case where a pressing force is applied to the liquid crystal display panel from the counter substrate 200 side or a TFT substrate 100 side. In this case, the stopper formed of the bus electrode 108 and the projecting ITO 113 on the TFT-substrate-100 side bites into the distal end of the columnar spacer 203. This is because that the columnar spacer 203 is made of a resin such as an acrylic resin and possesses high elasticity.

As described above, the stopper formed over the TFT substrate 100 bites into the columnar spacer 203 and hence, it is possible to prevent the movement of the columnar spacer 203 in the y direction as indicated by an arrow in FIG. 1. Since the movement of the columnar spacer 203 can be prevented, there exists no possibility that the columnar spacer 203 projects toward the pixel electrode 112 and causes the alignment disorder of liquid crystal. Further, since the movement of the columnar spacer 203 can be prevented, there exists no possibility that the alignment film 111 is shaved and shaved chips of the alignment film 111 formed by shaving are scattered to the periphery of the columnar spacer 203. Accordingly, it is possible to prevent lowering of contrast of an image displayed on the liquid crystal display device.

The stopper shown in FIG. 1 is formed of the bus electrode 108 which extends in the x direction in FIG. 2. Accordingly, the movement of the columnar spacer 203 in the y direction in FIG. 2 can be prevented by the stopper. On the other hand, the movement of the columnar spacer 203 in the x direction in FIG. 2 is prevented by the bus electrode 108 which extends in the y direction. Accordingly, by forming the bus electrodes 108 shown in FIG. 2, it is possible to prevent the movement of the columnar spacer 203 in both longitudinal and lateral directions in FIG. 2.

Here, for preventing the movement of the columnar spacer 203, a width of the stopper, that is, a width of the bus electrode 108 is important. This is because that, if the width of the stopper, that is, the width of the bus electrode 108 is large, the stopper does not bite into the columnar spacer 203 when a pressing force is applied to the liquid crystal display panel. FIG. 5 shows a table which shows a result of investigation on the occurrence of minute luminescent points, that is, a light leaking state when the width of the stopper is changed.

In FIG. 5, a thickness (A) of the bus electrode 108 is fixed to 220 nm, while a width (B) of the bus electrode 108 is changed from 12 μm to 3 μm. Here, the width of the bus electrode 108 means a width of an upper portion of the bus electrode 108 in FIG. 1. A thickness (C) of the alignment film 111 is changed from 90 nm to 50 nm in accordance with the width of the bus electrode 108. The thickness of the alignment film 111 is not changed intentionally but is decreased along with the decrease of the line width of the bus electrode 108. That is, in FIG. 5, the width of the bus electrode 108 decisively influences the occurrence of minute luminescent points.

In FIG. 5, when the width of the bus electrode 108 is 12 μm or 6 μm, the alignment disorder of liquid crystal molecules attributed to the movement of the columnar spacer 203 or the occurrence of minute luminescent points attributed to the shaving of the alignment film 111 is observed. However, when the width of the bus electrode 108 is 3 μm, the occurrence of minute luminescent points is not observed. That is, when the width of the bus electrode 108 is less than 3 μm, the width of the stopper is sufficiently small so that even when a pressing force is applied to the liquid crystal display panel from the outside, it is possible to prevent the movement of the columnar spacers 203.

Figure 8:
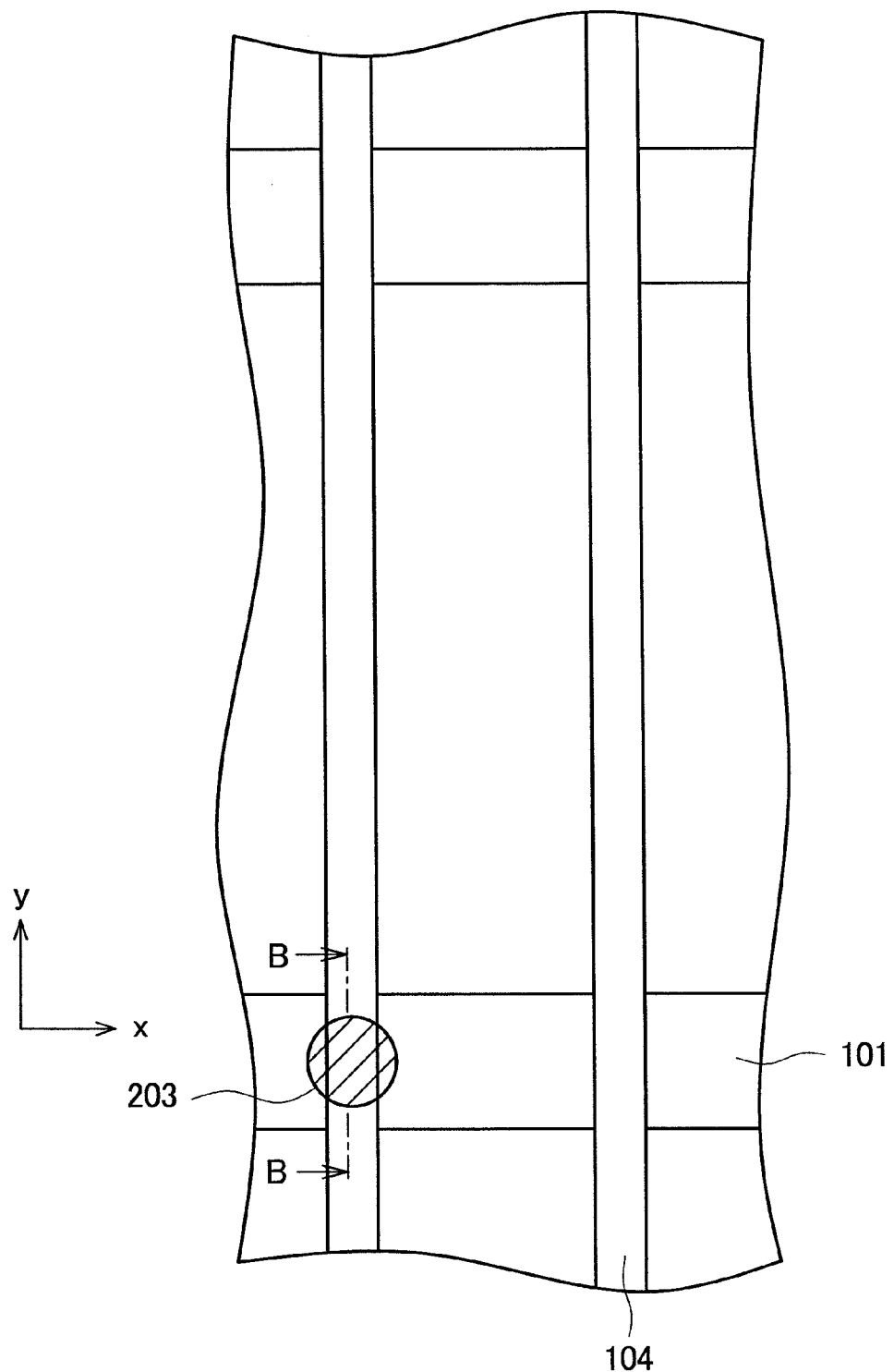
FIG. 8 is a plan view of the conventional liquid crystal display device.

FIG. 8 is a view showing a state where the bus electrodes 108 are not formed in an IPS having substantially the same constitution as this embodiment or a state where the bus electrode 108 is formed to have a large width substantially equal to a width of the scanning line 101. In the same manner as the constitution shown in FIG. 2, a columnar spacer 203 is formed over an intersection of the scanning line 101 and the video signal line 104. In such a constitution, on a distal end of the columnar spacer 203, a projection is not formed over the counter substrate 200.

Figure 7:
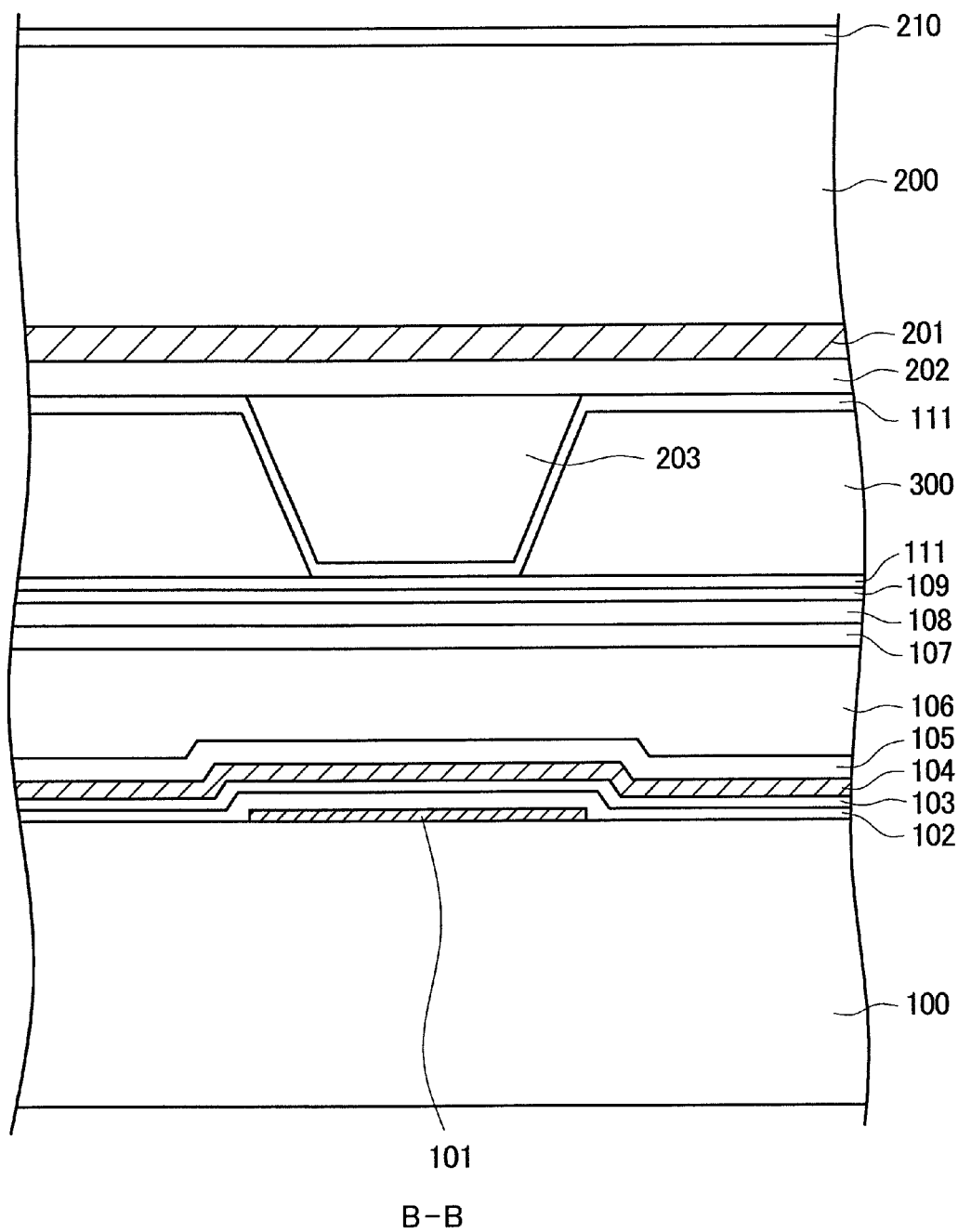
FIG. 7 is a cross-sectional view of a conventional liquid crystal display device.

FIG. 7 is a cross-sectional view of the IPS taken along a line B-B in FIG. 8. The constitution shown in FIG. 7 is substantially equal to the constitution shown in FIG. 1 except for the counter substrate 200 and portions of the TFT substrate 100 which face the columnar spacer 203 in an opposed manner and hence, their explanation is omitted. In FIG. 7, the constitution up to the interlayer insulation film 107 of the TFT substrate 100 is substantially equal to the corresponding constitution shown in FIG. 1. Although the bus electrodes 108 are formed over the interlayer insulation film 107, a width of the bus electrode 108 is larger than a diameter of the columnar spacer 203. A counter electrode 109 is formed over the bus electrodes 108, and an alignment film 111 is formed over the counter electrode 109.

In FIG. 7, the width of the bus electrode 108 is larger than the diameter of the columnar spacer 203 and hence, no projections corresponding to the columnar spacers 203 are formed over the TFT substrate 100 side. This constitution is applicable to the x direction as well as to the y direction shown in FIG. 8. Accordingly, in the conventional structure of the liquid crystal display device shown in FIG. 7 and FIG. 8, the columnar spacer 203 is movable in the x direction, in the y direction in FIG. 8 or in any other directions. Accordingly, the alignment disorder of liquid crystal attributed to the movement of the columnar spacer 203 or the leaking of light attributed to the shaving of the alignment film 111 or the like occurs leading lowering of contrast of an image displayed on the liquid crystal display device.

In FIG. 2 which shows the embodiment 1 of the invention, the bus electrode 108 is formed in a cruciform shape on the intersection of the scanning line 101 and the video signal line 104. Further, the center of the columnar spacer 203 is aligned with the intersection of the cruciform shape of the bus electrode 108. There exists no problem when the TFT substrate 100 and the counter substrate 200 are accurately aligned with each other. However, when the misalignment occurs between the TFT substrate 100 and the counter substrate 200, there may be a case where the projection formed by the bus electrode 108 does not correspond to the distal end of the columnar spacer 203.

Figure 6:
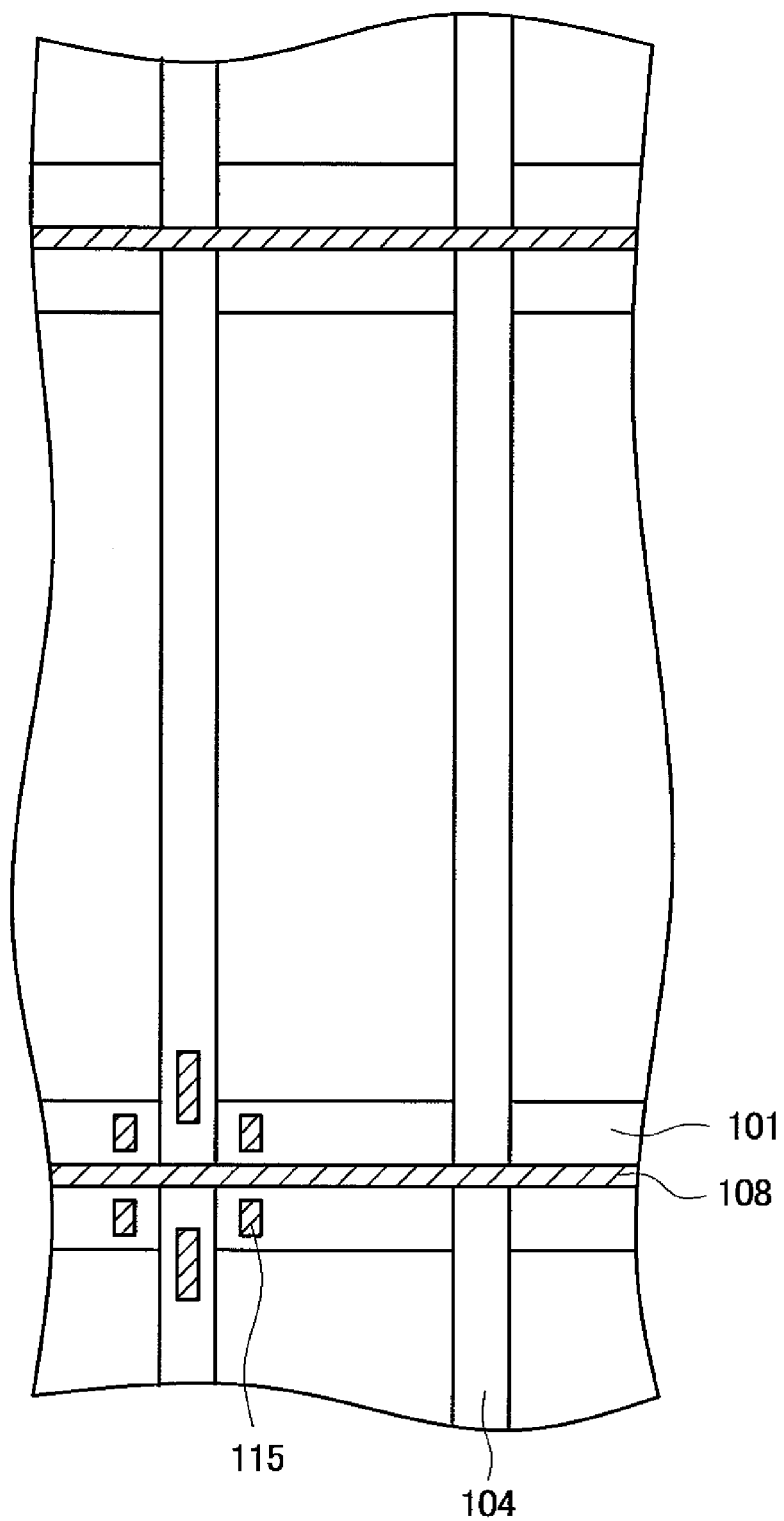
FIG. 6 is a plan view of another example of the liquid crystal display device according to the embodiment 1.

FIG. 6 shows an example where the projection is formed so as to cope with such a case. In FIG. 6, the columnar spacer 203 is arranged on an intersection of the scanning line 101 and the video signal line 104 at a left lower position in the drawing. At such a position, the bus electrode 108 extends in the x direction. Further, island-shaped bus electrodes 115 are respectively formed above and below the bus electrode 108 extending in the x direction such that the island-shaped bus electrodes 115 sandwich the bus electrode 108 extending in the x direction therebetween. In other words, a plurality of projections are formed by the island-shaped bus electrodes 115. These island-shaped bus electrodes 115 form the projections. Here, an island-shaped ITO is formed over each island-shaped bus electrode 115.

When the center of the columnar spacer 203 is displaced from the intersection of the scanning line 101 and the video signal line 104 attributed to the misalignment between the TFT substrate 100 and the counter substrate 200, the projections which are formed of the island-shaped bus electrodes 115 function as projections corresponding to the columnar spacers 203. The island-shaped projections are formed above, below or obliquely with respect to the center of the intersection of the scanning line 101 and the video signal line 104. Accordingly, the island-shaped projections can cope with the displacement of the TFT substrate 100 and the counter substrate 200 irrespective of the direction of the displacement.

As has been explained heretofore, according to this embodiment, in the IPS liquid crystal display device in which the comb-teeth-shaped counter electrode 109 is arranged on an upper side and a planar pixel electrode 112 is arranged on a lower side in the pixel region, even when a pressing force is applied to the liquid crystal display panel from the outside, it is possible to prevent the leaking of light attributed to the displacement of the columnar spacers 203 thus preventing lowering of contrast of an image displayed on the liquid crystal display device.

Embodiment 2

Figure 9:
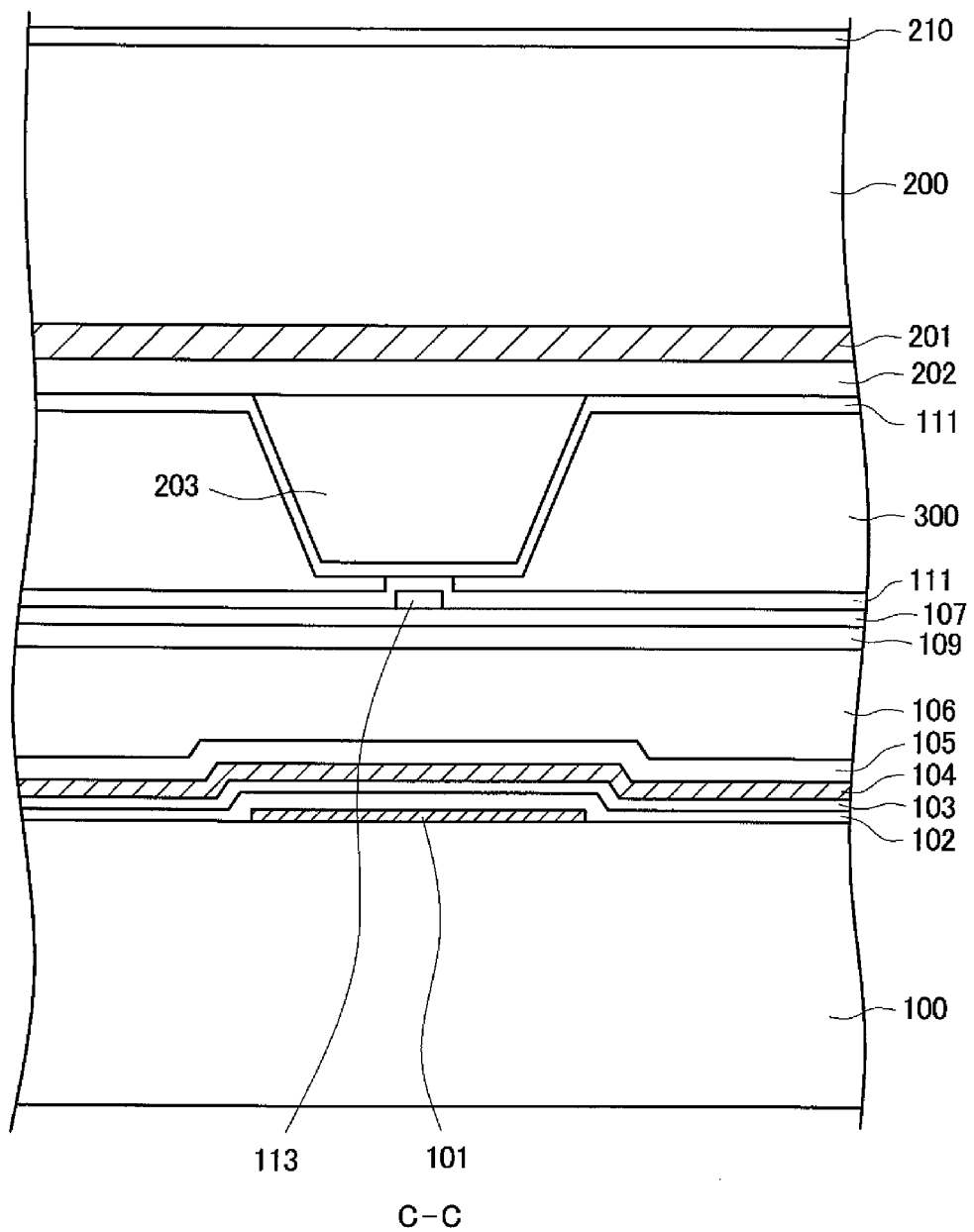
FIG. 9 is a cross-sectional view of a liquid crystal display device according to an embodiment 2.
Figure 10:
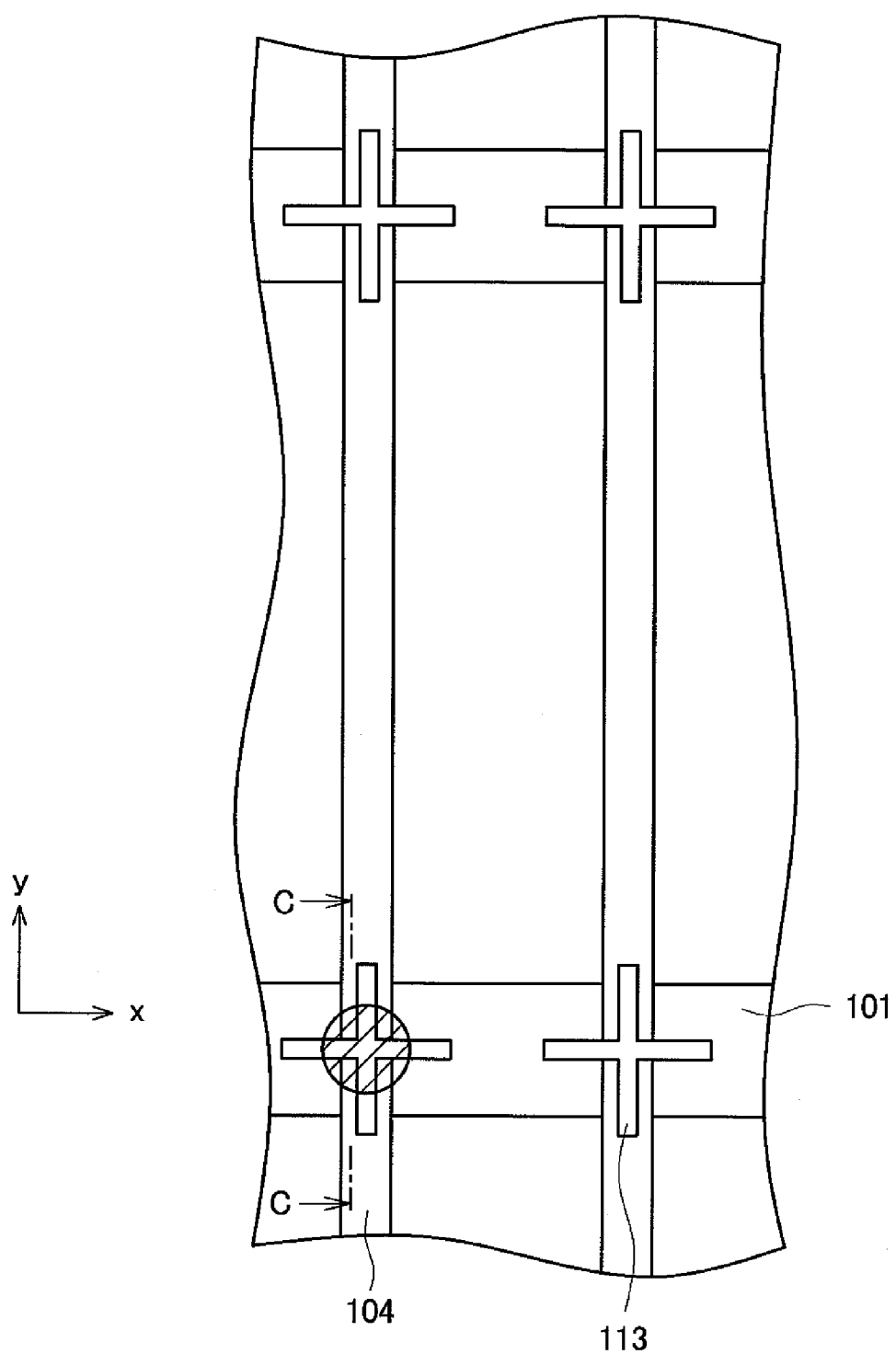
FIG. 10 is a plan view of a liquid crystal display device according to the embodiment 2 or an embodiment 3.

FIG. 9 and FIG. 10 are views showing a liquid crystal display device according to a second embodiment of the invention. That is, FIG. 9 and FIG. 10 show a case where the invention is applied to an IPS in which a planar counter electrode 109 is formed over a lower side and comb-teeth-shaped pixel electrodes 112 are formed over an upper side by way of an interlayer insulation film 107 formed therebetween. FIG. 10 is a plan view which corresponds to FIG. 2 showing the embodiment 1. In FIG. 10, scanning lines 101 extend in the lateral direction and are arranged parallel to each other in the longitudinal direction. Video signal lines 104 extend in the longitudinal direction and are arranged parallel to each other in the lateral direction. A pixel is formed in a region surrounded by the scanning lines 101 and the video signal lines 104.

The constitution which makes the embodiment 2 different from the embodiment 1 shown in FIG. 2 lies in that, in the pixel, for example, a pixel electrode 112 having a shape shown in FIG. 4 is formed on an upper side and a matted planar counter electrode 109 is formed on a lower side while sandwiching an interlayer insulation film 107 therebetween. In FIG. 10, at an intersection of the scanning line 101 and the video signal line 104, a projecting ITO 113 which is formed on the same layer as the pixel electrode 112 is formed in a laterally and longitudinally extending manner thus forming a cruciform-shaped projection.

That is, although the projection is formed by the bus electrode 108 in the embodiment 1, in this embodiment, the projection is formed by the projecting ITO 113 which is formed on the same layer as the pixel electrode 112. The projecting ITO 113 can be formed simultaneously with the pixel electrode 112 and hence, there exists no possibility that the number of manufacturing steps is increased.

Differently from the bus electrode 108 used in the embodiment 1, the projecting ITO 113 is not formed continuously in the lateral direction. This is because, differently from the bus electrode 108 used in the embodiment 1, the projecting ITO 113 does not have a role of supplying a potential to the pixel electrode 112 or the counter electrode 109.

FIG. 9 is a cross-sectional view taken along a line C-C in FIG. 10. In FIG. 9, a counter substrate 200 is substantially equal to the counter substrate 200 of the embodiment 1 shown in FIG. 1. On the TFT substrate 100 side, the constitution up to the organic passivation film 106 is substantially equal to the corresponding constitution shown in FIG. 1. In FIG. 9, the counter electrode 109 made of ITO is formed over an organic passivation film 106 in a planar matted manner. Although a bus electrode 108 made of metal such as Cr, Mo may be formed below the counter electrode 109, the constitution shown in FIG. 9 is not provided with the bus electrode 108 for the counter electrode 109.

An interlayer insulation film 107 is formed over the counter electrode 109. A projection formed of a projecting ITO 113 is formed over the interlayer insulation film 107. Since the projecting ITO 113 is formed simultaneously with the formation of a pixel electrode 112 in a pixel, there is no increase of manufacturing steps. An alignment film 111 is formed over the projecting ITO 113.

The projections made of ITO are brought into contact with columnar spacers 203 formed over a counter substrate 200. When the counter substrate 200 or the TFT substrate 100 receives a pressing force from the outside, the projection shown in FIG. 9 bites into a distal end of a columnar spacer 203 so that displacement of the columnar spacer 203 in the longitudinal direction as well as in the lateral direction can be prevented. That is, this embodiment can acquire the substantially same advantageous effects as the embodiment 1 due to the projecting ITO 113.

Also in this embodiment, it is necessary that a width of the projecting ITO 113 which forms the projection is small. It is necessary for the projection to bite into a distal end of the columnar spacer 203 to satisfy its object and hence, the result of investigation shown in FIG. 5 with respect to the embodiment 1 is directly applicable to this embodiment 2. That is, it is necessary to set the width of the projecting ITO 113 to 3 μm or less.

In the embodiment 1, the projection is formed of the bus electrode 108 and the projecting ITO 113. In FIG. 9, the projection is formed of only the projecting ITO 113 and hence, a height of the projection is lower than that of the embodiment 1. However, it is sufficient for the projection used in the invention so long as the projection can prevent the movement of the columnar spacer 203 in the lateral direction and hence, the height of the projection does not cause any serious problem compared to the width of the projection.

However, when a film thickness of the ITO film which constitutes the pixel electrode 112 is extremely small, there may be a case where the height of the ITO film for forming the projection is insufficient. In such a case, in forming the bus electrode 108 not shown in FIG. 9 below the counter electrode 109, a width of the bus electrode 108 may be set small, that is, 3 μm or less, so that it is possible to substantially increase the height of the projection.

FIG. 9 shows a case where, as shown in FIG. 10, the projecting ITO 113 is formed in a cruciform shape in the vicinity of an intersection of a scanning line 101 and a video signal line 104. However, also in this embodiment, by forming the projecting ITO 113 in an island shape as in the case of the constitution of the embodiment 1 shown in FIG. 6, even when the TFT substrate 100 and the counter substrate 200 are misaligned from each other, it is possible to make the projection formed over the TFT substrate 100 correspond to the distal end of the columnar spacer 203.

Embodiment 3

Figure 11:
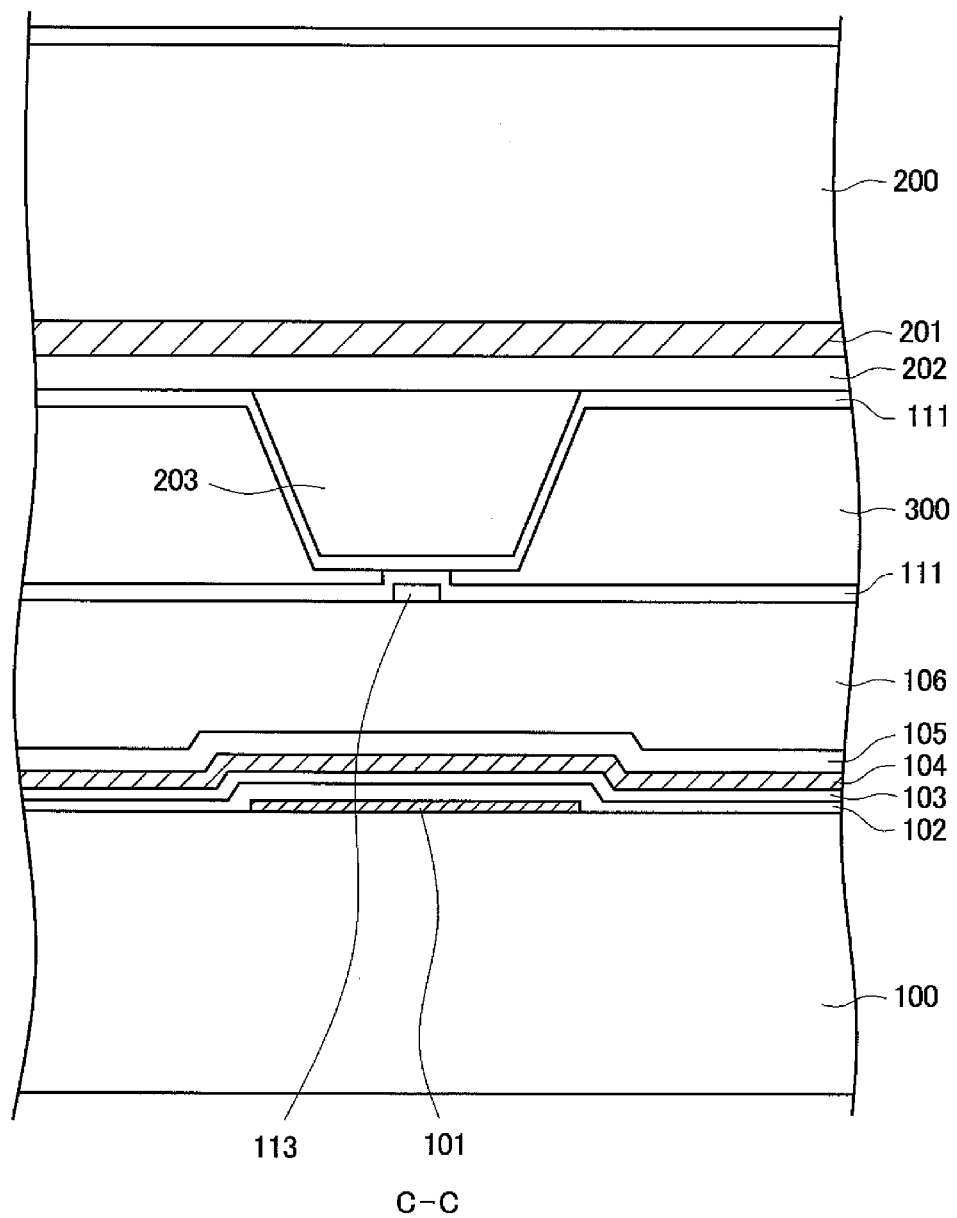
FIG. 11 is a cross-sectional view of the liquid crystal display device according to the embodiment 3.

FIG. 11 shows a case where the invention is applied to a usual TN (Twisted Nematic) type or VA (Vertical Alignment) type liquid crystal display device. In the TN-type or VA-type liquid crystal display device, pixel electrodes 112 are formed over a TFT substrate 110 and a counter electrode 109 is formed over a counter substrate 200. In the TN-type liquid crystal display device, a quantity of light which passes through a liquid crystal layer 300 is controlled by twisting liquid crystal molecules using an electric field generated in the direction perpendicular to the substrate. On the other hand, in the VA-type liquid crystal display device, a quantity of light which passes through a liquid crystal layer 300 is controlled by tilting liquid crystal molecules arranged in the longitudinal direction.

The plan view of the TFT substrate 100 of this embodiment is substantially equal to the plan view of the TFT substrate 100 shown in FIG. 10. In FIG. 10, the projecting ITO 113 of this embodiment is formed using ITO for forming the pixel electrode 112 in the same manner as the embodiment 2. This embodiment differs from the embodiment 2 with respect to the cross section of the TFT substrate 100 and the counter substrate 200 as shown in FIG. 11 which is a cross-sectional view in FIG. 11 corresponding to a cross-sectional view taken along a line C-C in FIG. 10.

In FIG. 11, the constitution up to the organic passivation film 106 on the TFT substrate 100 is substantially equal to the corresponding constitution shown in FIG. 1. On the organic passivation film 106, projections formed of projecting ITO 113 are formed. The projecting ITO 113 is formed on the same layer as a pixel electrode 112 and hence, there is no increase of manufacturing steps. In the TN-type or VA-type liquid crystal display device, it is unnecessary to make an ITO film for forming the pixel electrode 112 extremely thin and hence, the projection having a sufficient height can be formed. An alignment film 111 is formed so as to cover the projections and the organic passivation film 106.

In FIG. 11, a black matrix 201 and an overcoat film 202 are sequentially formed on an inner side of the counter substrate 200 in the same manner as the constitution shown in FIG. 1. In FIG. 11, the counter electrode 109 is formed over the overcoat film 202. A reference voltage is applied to the counter electrode, a vertical electric field is generated between the reference voltage and a video signal voltage applied to the pixel electrode 112 formed over the TFT substrate 100 thus controlling transmissivity of a liquid crystal layer 300.

Columnar spacers 203 are formed over the counter electrode 109. The manner of forming the columnar spacer 203 is substantially equal to the manner of forming the columnar spacer 203 explained in conjunction with the embodiment 1. An alignment film 111 is formed over the columnar spacers 203 and the counter electrode 109. A projection formed over the TFT substrate 100 is brought into contact with a distal end of the columnar spacer 203.

When the counter substrate 200 or the TFT substrate 100 receives a pressing force from the outside, the projection formed over the TFT substrate 100 bites into the distal end of the columnar spacer 203 so that movement of the columnar spacer 203 in the direction parallel to the substrate can be prevented. To allow the projection to bite into the columnar spacer 203 when the liquid crystal display panel receives a pressing force from the outside, a width of the projection is important in the same manner as the embodiment 1. That is, as shown in FIG. 5 which shows the constitution of the embodiment 1, by setting the width of the projecting ITO 113 to 3 pin or less, it is possible to prevent the movement of the columnar spacer 203 when the liquid crystal display panel receives a pressing force from the outside.

FIG. 11 shows a case where, as shown in FIG. 10, the projecting ITO 113 is formed in a cruciform shape in the vicinity of an intersection of a scanning line 101 and a video signal line 104. However, also in this embodiment, by forming the projecting ITO 113 in an island shape as in the case of the constitution of the embodiment 1 shown in FIG. 6, even when the TFT substrate 100 and the counter substrate 200 are misaligned from each other, it is possible to make the projection formed over the TFT substrate 100 correspond to the distal end of the columnar spacer 203.

As has been explained heretofore, according to the invention, also in the TN-type and VA-type liquid crystal display devices, it is possible to prevent the displacement of the columnar spacer 203 formed over the counter substrate 200 in the direction parallel to the substrate when the liquid crystal display panel receives a pressing force from the outside. Accordingly, it is possible to prevent the alignment disorder of liquid crystal molecules attributed to the displacement of the columnar spacer 203 or leaking of light attributed to shaved chips of alignment film 111 formed by shaving thus preventing lowering of contrast of an image of the liquid crystal display device.

What is claimed is:

1. A liquid crystal display device comprising:
    a TFT substrate on which a pixel is formed in each of regions surrounded by scanning lines which extend in a first direction and are arranged parallel to each other in a second direction and video signal lines which extend in the second direction and are arranged parallel to each other in the first direction;
    a counter substrate which is arranged to face the TFT substrate in an opposed manner; and
    a liquid crystal layer which is sandwiched between the TFT substrate and the counter substrate, wherein
    a pixel electrode made of a transparent conductive film formed in a planar shape, and a counter electrode made of a transparent conductive film and formed in a comb-teeth shape on the pixel electrode by way of an insulation film are arranged in the pixel,
    columnar spacers which define a distance between the TFT substrate and the counter substrate are formed over the counter substrate,
    a gate insulation film is formed on the scanning lines, the video signal lines are formed over the gate insulation film, a passivation film is formed on the video signal lines, and the insulation film is formed over the passivation film,
    a bus electrode made of elemental metal which extends in the first direction and is connected with the counter electrode is formed over the insulation film and the scanning line formed over the TFT substrate,
    an alignment film formed over the counter electrode, the insulation film, and the bus electrode, and
    a distal end of the columnar spacer faces the bus electrode in an opposed manner, and the bus electrode which extends in the first direction has a width which is no greater than 3 μm and which is less than a width of the scanning line which extends in the first direction.

2. A liquid crystal display device according to claim 1, wherein the bus electrode has a portion which extends in the second direction and has a cruciform shape at an intersection of the scanning line and the video signal line, and a distal end of the columnar spacer faces the bus electrode having the cruciform shape in an opposed manner.

3. A liquid crystal display device according to claim 1, wherein island-shape projections which are formed using the same material as the bus electrode are formed in the vicinity of intersections of the scanning lines and the video signal lines while sandwiching the bus electrode between two neighboring projections,
    a width of the island-shape projection is no greater than 3 μm, and
    the columnar spacer faces either one of the bus electrode and the island-shape projection in an opposed manner.

4. A liquid crystal display device according to claim 1, wherein an upper surface of the bus electrode is covered by a transparent conductive film.

5. A liquid crystal display device according to claim 4, wherein a side surface of the bus electrode is in contact with the alignment film.

6. A liquid crystal display device according to claim 1, wherein a side surface of the bus electrode is in contact with the alignment film.

7. A liquid crystal display device according to claim 2, wherein an upper surface of the bus electrode is covered by a transparent conductive film.

8. A liquid crystal display device according to claim 7, wherein a side surface of the bus electrode is in contact with the alignment film.

9. A liquid crystal display device according to claim 2, wherein a side surface of the bus electrode is in contact with the alignment film.

10. A liquid crystal display device according to claim 1, wherein the width of the bus electrode of no greater than 3 μm is sufficiently small to substantially prevent movement of the columnar spacers.

* * * * *